United States Patent [19]

Wan

[11] Patent Number: 5,284,059
[45] Date of Patent: Feb. 8, 1994

[54] ROTATION SENSOR

[75] Inventor: Lawrence A. Wan, Malibu, Calif.

[73] Assignee: Bei Electronics, Inc., Sylmar, Calif.

[21] Appl. No.: 71,866

[22] Filed: Jun. 2, 1993

Related U.S. Application Data

[63] Continuation of Ser. No. 751,280, Aug. 29, 1991, abandoned.

[51] Int. Cl.$^5$ .............................................. G01P 9/04
[52] U.S. Cl. ........................................ 73/505; 73/510
[58] Field of Search ...................... 73/505, 510, DIG. 1

[56] References Cited

U.S. PATENT DOCUMENTS

| | | | |
|---|---|---|---|
| 2,514,250 | 7/1950 | Meredith | 73/505 |
| 3,842,681 | 10/1974 | Mumme | 73/505 |
| 4,538,461 | 9/1985 | Juptner et al. | 73/505 |

*Primary Examiner*—John E. Chapman
*Attorney, Agent, or Firm*—Townsend and Townsend Khourie and Crew

[57] ABSTRACT

A silicon chip is micromachined so that a plurality of tines extend radially and coplanarly from an outer peripheral surface of a circular base. First and second mounting members extend from the base for mounting the base to a support. The first mounting member is disposed generally perpendicularly to the second mounting member. A pulse generator applies electrostatic or electromagnetic pulses to successive free ends of the plurality of tines so that each tine momentarily vibrates in the plane in rotational sequence along the circumference of the base. The successive vibrations establish a net angular momentum approximating a spinning wheel so that rotation of the sensor about the axis of one of the first or second mounting members causes the other mounting member to experience a deformation due to coriolus force. A plurality of strain gages interconnected to form wheatstone bridges are disposed on the first and second mounting members for respectively sensing deformation of the first and second mounting members in a push-pull manner. The output signals from the strain gages provide an indication of the amount of angular motion. A linear accelerometer may be combined on the same silicon chip, and three such chips may be combined to create an inertial measurement unit that senses rotation and linear acceleration relative to three axes.

29 Claims, 3 Drawing Sheets

ROTATION SENSOR

This is a continuation of application Ser. No. 751,280, filed Aug. 29, 1991, now abandoned.

BACKGROUND OF THE INVENTION

The present invention relates to rotation sensors and, more particularly, to a silicon microgyro rotation sensor.

Navigational and inertial guidance systems for many types of craft often use data about the angular rate of motion of the craft to control the desired movement of the craft. One device which provides data about angular motion is the well known gyroscope. Gyroscopes, however, have many disadvantages. They are physically large and heavy, yet they must be built to extremely high accuracies at great cost, and they may be damaged by even low levels of shock and vibration. To minimize the effects of shock and vibration, they must be protected with heavy mounting devices, thus further increasing size, weight and cost. Furthermore, since critical moveable elements, such as bearings, usually wear with use, the gyroscopes must be frequently maintained to retain precision. Despite the frequent maintenance and high accuracy required, they still may have an error drift rate of fractions of a degree per hour.

Another type of angular motion sensor which attempts to overcome the disadvantages of traditional gyroscopes is disclosed in U.S. Pat. No. 4,899,587, issued to Juergen H. Staudte. That patent discloses an angular rate sensor comprising first and second tuning forks made of quartz. The stems of the forks are coupled together end to end along an axis of symmetry so that the tines face away from each other and lie in a plane. A mount is provided for attaching the dual fork structure to a support. Energy is provided to the tines of the first fork through a pair of electrodes coupled to an oscillator. The oscillator signals cause the tines of the first fork to vibrate in the plane. When the structure rotates about the axis of symmetry, a coriolus force causes the tines of the second fork to vibrate in a direction normal to the plane. The vibratory motion of the tines of the second fork is sensed with output electrodes for providing a signal indicating angular motion about the single axis.

Unfortunately, the electronics required for driving and sensing the vibratory motion of the forks is very complex and difficult to extract. The device is extremely susceptible to acoustic and vibrational interference, and the piezoelectric properties of quartz make the device very sensitive to stray capacitances. The support mounting for the fork structure creates unwanted stresses and points of failure, and the temperature anomalies of quartz create other electrical and mechanical difficulties. Finally, each device can sense rotation along only a single axis.

SUMMARY OF THE INVENTION

The present invention is directed to a silicon microgyro capable of sensing rotation about two axes wherein the complete structure may be micromachined from a silicon substrate using well known photolithographic and etching techniques. The critical components of the structure are integrally formed, so unwanted mechanical stresses are eliminated. The micromachined chip may be housed between two etched silicon covers. The silicon covers can be fused together to form a single homogeneous silicon structure with no temperature coefficient differences. The electronics used to operate the rotation sensor may be easily placed on the housing by direct diffusion in the silicon or by bonding an ASIC chip to the housing.

In one embodiment of a rotation sensor according to the present invention, a silicon chip is micromachined so that a plurality of tines extend radially and coplanarly from an outer peripheral surface of a circular base. First and second mounting members extend from the base for mounting the base to a support. The first mounting member is disposed generally perpendicularly to the second mounting member. A pulse generator applies electrostatic or electromagnetic pulses to successive free ends of the plurality of tines so that each tine momentarily vibrates in the plane in rotational sequence along the circumference of the base. The successive vibrations establish a net angular momentum approximating a spinning wheel so that rotation of the sensor about the axis of one of the first or second mounting members causes the other mounting member to experience a deformation due to Coriolis force. A plurality of piezoresistive strain gages interconnected to form Wheatstone bridges are disposed on the first and second mounting members for respectively sensing deformation of the first and second mounting members in a push-pull manner. The push-pull effect of the oppositely situated strain gages provide a noise and error cancellation advantage. The output signals from the strain gages thus provide a reliable indication of the amount of angular motion.

In contrast to quartz-based rotation sensors, an optional linear accelerometer may be combined on the same chip with the rotation sensor. Three such chips may be combined to create an inertial measurement unit (IMU) that senses rotation and linear acceleration relative to three axes.

DETAILED DESCRIPTION OF THE PREFERRED EMBODIMENTS

Figure 1:
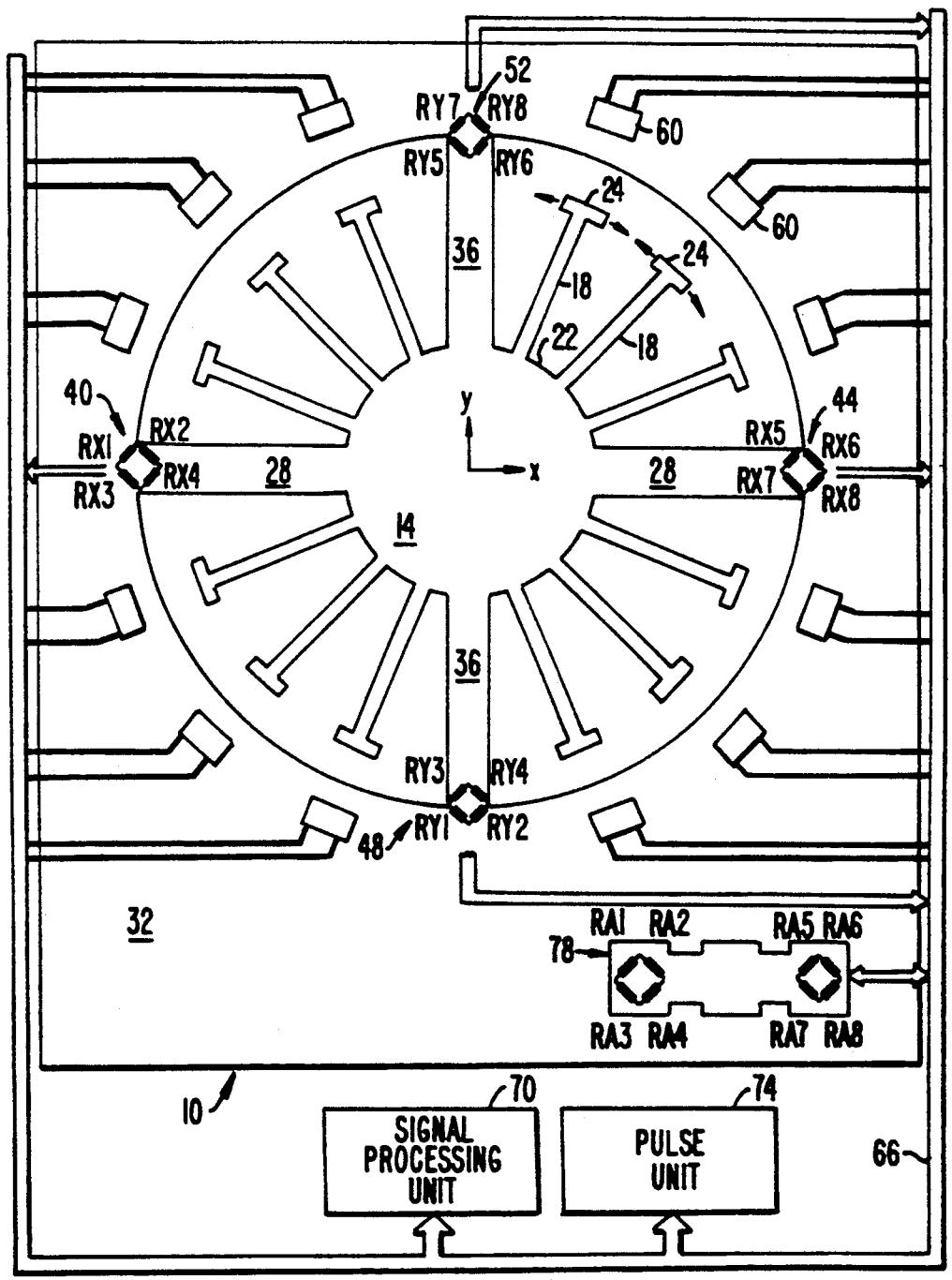
FIG. 1 is a top view of a particular embodiment of a silicon microgyro rotation sensor and optional linear accelerometer according to the present invention.

FIG. 1 is a top view of a particular embodiment of a silicon microgyro rotation sensor 10 according to the present invention. Microgyro 10 comprises a circular base 14 from which extend a plurality of tines 18. More specifically, tines 18 extend coplanarly from an outer peripheral surface 22 of base 14, and each tine 18 has a T-shaped free end 24. A first mounting member 28 extends in opposite directions from base 14 along the X axis shown for mounting the structure to a support 32. A second mounting member 36 likewise extends in opposite directions from base 14 along the Y axis shown. Base 14, tines 18, first mounting member 28, second mounting member 36, and support 32 may be integrally micromachined from a silicon wafer using standard silicon photolithographic and etching techniques.

Diffused within first mounting member 28 are piezoresistive strain gages RX1-RX8 wherein strain gages RX1-RX4 and RX5-RX8 are interconnected to form two Wheatstone bridges 40 and 44, respectively, for sensing deformation (e.g., flexure, strain, compression, torsion, etc.) of first mounting member 28. Similarly, piezoresistive strain gages RY1-RY8 are diffused within second mounting member 36 and are interconnected to form two Wheatstone bridges 48 and 52, respectively, for sensing deformation of second mounting member 36.

Disposed on support 32 are a plurality of electrodes 60 which may be formed by depositing and etching a metal layer according to well known metallization techniques. The electrodes 60 are preferably skewed relative to the T-shaped free ends 24 of tines 18. Optionally disposed on support 32 are diffused piezoresistive strain gages RA1-RA8 which are interconnected in a manner well known in the art to form a piezoresistive linear accelerometer. The connections for Wheatstone bridges 40, 44, 48, and 52, electrodes 60, and accelerometer 78 form a bus 66 which, in turn, is coupled to a signal processing unit 70 and to a pulse unit 74.

In operation, pulse unit 74 sequentially pulses each successive tine electrostatically or electromagnetically via electrodes 60 in either a clockwise or counterclockwise spin direction at approximately 20 kHz. Each pulse from the skewed electrode 60 causes the associated tine to vibrate momentarily back and forth in the plane as shown by the arrows. The net effect is a spinning "pocket" of tine vibration which travels circularly about the structure to create a net angular momentum approximating a spinning wheel. Thus, if the structure is rotated about the Y axis, a Coriolis force causes first mounting member 28 to experience a deformation, whereas if the structure rotates about the X axis, then a Coriolis force causes the second mounting member 36 to experience a deformation. The amount of deformation is sensed by the corresponding wheatstone bridges 40, 44 or 48, 52, and the signals may be processed by signal processing unit 70 to produce a direct indication of the amount of angular rotation. Signal processing unit 70 also may process the signals from accelerometer 78 to provide an indication of the amount of linear acceleration of the microgyro structure.

Figure 2:
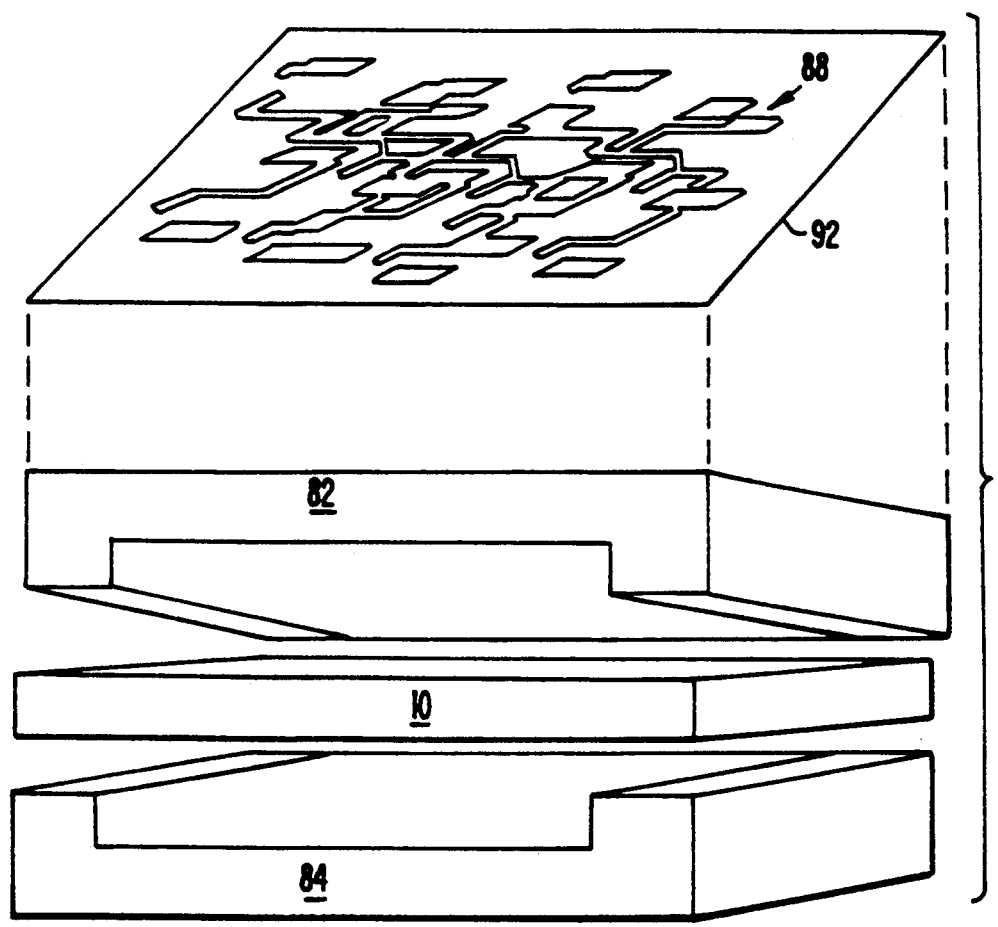
FIG. 2 is an exploded view of a particular embodiment of a housing for the microgyro shown in FIG. 1.

FIG. 2 is an exploded view of an optional structure 80 according to the present invention for housing microgyro 10. The housing comprises etched silicon covers 82, 84. The covers may be bonded through ion infusion to produce a unitary piece of silicon with no thermal coefficient differences. Application Specific Integrated Circuit (ASIC) or other electronics 88 may be formed on a chip 92 (or diffused in a surface of members 82 or 84) and connections made to microgyro 10 for efficiently using space. Electronics 88 may include portions of signal processing unit 70 and/or pulse unit 74 if desired.

Figure 3:
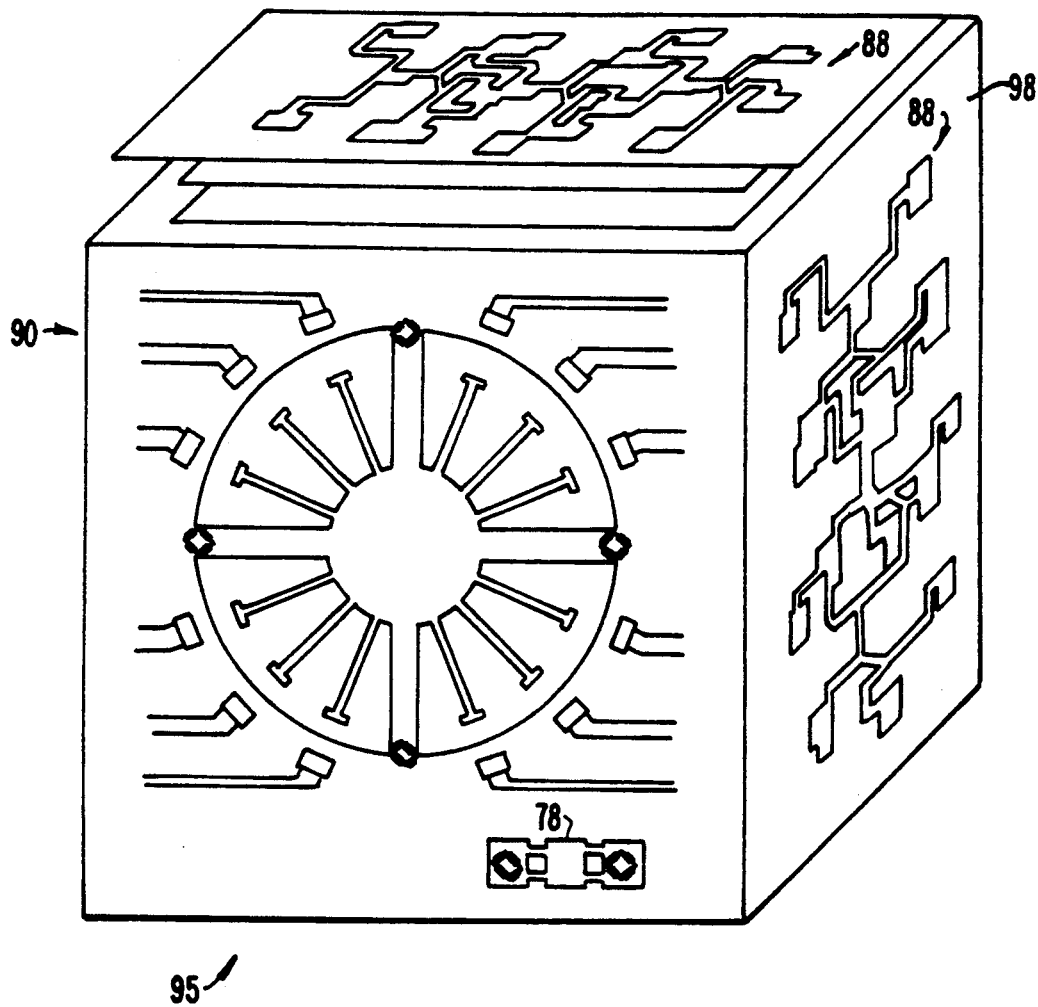
FIG. 3 is a perspective view of a particular embodiment of an IMU which senses rotation and linear acceleration relative to three axes.

FIG. 3 is a perspective view of a three-axis double redundant IMU 95 according to the present invention which senses angular rotation and linear acceleration relative to three axes. In this embodiment, three microgyros 10 (only one shown) are bonded onto a silicon cube 98 along three perpendicular axes. The three microgyros sense rotation about the three axes with double redundancy (since each microgyro senses rotation about two perpendicular axes), and the three linear accelerometers measure linear displacement acceleration along the three axes.

While the above is a complete description of a preferred embodiment of the present invention, various modifications may be employed. For example, the momentum spin rate can be optimized for a particular rotation rate sensing requirement, and radially opposite spokes may be simultaneously pulsed to produce two or more pockets of tine vibration travelling circularly about the structure. Consequently, the scope of the invention should not be limited except as described in the claims.

What is claimed is:

1. A tine structure for a rotation sensor comprising:
    a base having an outer peripheral surface;
    a plurality of tines extending radially outwardly from the peripheral surface of the base so that free ends of the plurality of tines define a circle; and
    mounting means for mounting the base to the support so that the plurality of tines are disposed between the base and the support, the mounting means comprising:
        a first mounting member extending radially from the base, the first mounting member having a first end mounted to the base and a second end mounted to the support;
        a second mounting member extending radially from the base, the second mounting member having a first end mounted to the base and a second end mounted to the support;
        wherein the first mounting member and the second mounting member extend from opposite sides of the base along a first axis;
        a third mounting member extending radially from the base, the third mounting member having a first end mounted to the base and a second end mounted to the support;
        a fourth mounting member extending radially from the base, the fourth mounting member having a first end mounted to the base and a second end mounted to the support;
        wherein the third mounting member and the fourth mounting member extend from opposite sides of the base along a second axis;
        wherein the first axis is orthogonal to the second axis.

2. A tine structure for a rotation sensor comprising:
    a base;
    a plurality of tines extending radially from the base; and
    drive means for causing each tine to vibrate in rotational sequence about the base so that the plurality of tines establish a net angular momentum which approximates a spinning wheel.

3. The tine structure according to claim 2 wherein the base and the plurality of tines are formed from a silicon wafer.

4. The tine structure according to claim 2 wherein free ends of the plurality of tines define a circle.

5. A rotation sensor comprising:
    a plurality of radially extending tines;
    drive means for causing each tine to vibrate in rotational sequence so that the plurality of tines establish a net angular momentum which approximates a spinning wheel;
    mounting means for mounting the plurality of tines to a support, so that rotation of the structure about a selected axis causes the mounting means to deform; and
    deformation sensing means, disposed on the mounting means, for sensing deformation of the mounting means.

6. The rotation sensor according to claim 5 wherein the plurality of tines are generally coplanar.

7. The rotation sensor according to claim 6 wherein the drive means comprises pulse means for providing pulses to free ends of the plurality of tines so that each tine vibrates momentarily in sequence in the plane.

8. The rotation sensor according to claim 6 wherein free ends of the plurality of tines define a circle.

9. The rotation sensor according to claim 8 further comprising a base, and wherein the plurality of tines extend from the base.

10. The rotation sensor according to claim 9 wherein the base has a generally circular outer peripheral surface, and wherein the plurality of tines extend from the outer peripheral surface.

11. The rotation sensor according to claim 10 wherein the plurality of tines are disposed evenly about the base.

12. The rotation sensor according to claim 5 further comprising a base, and wherein the plurality of tines originate from the base.

13. The rotation sensor according to claim 12 wherein the mounting means extends from the base to the support.

14. The rotation sensor according to claim 13 wherein the deformation sensing means comprises a plurality of strain gages disposed on the mounting means and interconnected to form a wheatstone bridge.

15. The rotation sensor according to claim 12 wherein the mounting means comprises:
   a first mounting member extending from the base to the support;
   a second mounting member extending from the base to the support; and
   wherein the second mounting member is disposed generally perpendicularly to the first mounting member.

16. The rotation sensor according to claim 15 wherein the deformation sensing means comprises:
   a first plurality of strain gages disposed on the first mounting member and interconnected to form a first wheatstone bridge for sensing deformation of the first mounting member; and
   a second plurality of strain gages disposed on the second mounting member and interconnected to form a second wheatstone bridge for sensing deformation of the second mounting member.

17. The rotation sensor according to claim 5 further comprising an ASIC disposed on the support.

18. The rotation sensor according to claim 5 further comprising:
   a first silicon cover;
   a second silicon cover;
   wherein the plurality of tines, the mounting means, and the support are disposed between the first and second silicon covers; and
   wherein the first and second silicon covers are bonded together.

19. The rotation sensor according to claim 18 wherein the first and second silicon covers are bonded together through ion infusion for forming a unitary housing for the plurality of tines, the mounting means, and the support.

20. The rotation sensor according to claim 18 further comprising an ASIC disposed on the first silicon cover.

21. A rotation sensor comprising:
   a base having an outer peripheral surface;
   a plurality of tines extending radially and coplanarly from the outer peripheral surface of the base;
   a first mounting member extending from the base for mounting the base to a support;
   a second mounting member extending from the base for mounting the base to the support;
   wherein the second mounting member is disposed generally perpendicularly to the first mounting member;
   pulse means for providing pules to free ends of the plurality of tines so that each tine vibrates momentarily in rotational sequence in the plane for establishing a net angular momentum which approximates a spinning wheel;
   wherein rotation of the sensor about one of the first mounting member or second mounting member causes the other mounting member to deform;
   a first plurality of strain gages disposed on the first mounting member and interconnected to form a first Wheatstone bridge for sensing deformation of the first mounting member; and
   a second plurality of strain gages disposed on the second mounting member and interconnected to form a second Wheatstone bridge for sensing deformation of the second mounting member.

22. The rotation sensor according to claim 21 wherein the plurality of tines are disposed evenly about the base.

23. The rotation sensor according to claim 22 wherein free ends of the plurality of tines define a circle.

24. The rotation sensor according to claim 23 wherein the base, the plurality of tines, the first mounting member, and the second mounting member are each formed of silicon.

25. An inertial measurement unit formed from a silicon wafer comprising:
   a plurality of radially extending tines;
   drive means for causing each tine to vibrate in rotational sequence so that the plurality of tines establish a net angular momentum which approximates a spinning wheel;
   mounting means for mounting the plurality of tines to a support, so that rotation of the structure about a selected axis causes the mounting means to deform;
   deformation sensing means, disposed on the mounting means, for sensing deformation of the mounting means; and
   a linear accelerometer disposed on the support.

26. The inertial measurement unit according to claim 25 wherein the linear accelerometer comprises a plurality of interconnected strain gages.

27. The inertial measurement unit according to claim 26 wherein the plurality of strain gages are diffused into the support.

28. The inertial measurement unit according to claim 25 further comprising an ASIC disposed on the support.

29. An inertial measurement unit comprising:
   first, second and third inertial measurement chips, each chip being formed from a silicon wafer and including:
   a plurality of radially extending tines;
   drive means for causing each tine to vibrate in rotational sequence so that the plurality of tines establish a net angular momentum which approximates a spinning wheel;
   mounting means for mounting the plurality of tines to a support, so that rotation of the structure about a selected axis causes the mounting means to deform;

deformation sensing means, disposed on the mounting means, for sensing deformation of the mounting means; and a plurality of strain gages disposed on the support and interconnected to from a linear accelerometer;

wherein the first, second, and third inertial measurement chips are mounted generally perpendicularly to each other.

* * * * *